United States Patent
Missalla et al.

(10) Patent No.: US 8,460,624 B2
(45) Date of Patent: Jun. 11, 2013

(54) PROCESS AND PLANT FOR PRODUCING METAL OXIDE FROM METAL SALTS

(75) Inventors: Michael Missalla, Oberursel (DE); Pekka Hiltunen, Frankfurt am Main (DE); Roger Bligh, Lindfield (AU); Erwin Schmidbauer, Kastl (DE); Cornelis Klett, Frankfurt am Main (DE); Guenter Schneider, Lorsch (DE)

(73) Assignee: Outotec Oyj, Espoo (FI)

( * ) Notice: Subject to any disclaimer, the term of this patent is extended or adjusted under 35 U.S.C. 154(b) by 0 days.

(21) Appl. No.: 13/146,196

(22) PCT Filed: Dec. 18, 2009

(86) PCT No.: PCT/EP2009/009115
§ 371 (c)(1),
(2), (4) Date: Oct. 24, 2011

(87) PCT Pub. No.: WO2010/083865
PCT Pub. Date: Jul. 29, 2010

(65) Prior Publication Data
US 2012/0052000 A1    Mar. 1, 2012

(30) Foreign Application Priority Data
Jan. 26, 2009   (DE) .......................... 10 2009 006 095

(51) Int. Cl.
*B01J 8/00*   (2006.01)

(52) U.S. Cl.
USPC ............. 423/74; 423/148; 423/625; 423/659; 34/363

(58) Field of Classification Search
USPC ........ 423/625, 659, 148, 74, DIG. 16; 34/363
See application file for complete search history.

(56) References Cited

U.S. PATENT DOCUMENTS

| | | | | |
|---|---|---|---|---|
| 3,565,408 A | * | 2/1971 | Reh et al. | 423/625 |
| 3,579,616 A | * | 5/1971 | Reh | 423/625 |
| 4,076,796 A | * | 2/1978 | Reh et al. | 423/659 |
| 4,671,497 A | * | 6/1987 | Schmitz et al. | 266/172 |
| 5,286,472 A | | 2/1994 | Fulford | |
| 6,015,539 A | | 1/2000 | Schmidt et al. | |

(Continued)

FOREIGN PATENT DOCUMENTS

| AU | 747716 B2 | 5/2002 |
|---|---|---|
| DE | 3615622 A1 | 11/1987 |

(Continued)

OTHER PUBLICATIONS

European Patent Office, International Search Report in International Patent Application No. PCT/EP2009/009115 (Aug. 24, 2010).

*Primary Examiner* — Steven Bos
(74) *Attorney, Agent, or Firm* — Leydig, Voit & Mayer, Ltd.

(57) ABSTRACT

A process for producing metal oxide from a metal salt includes supplying a first part of the metal salt to a hydrate drier so as to indirectly heat the first part of the metal salt in the hydrate drier using a heat transfer medium from a first stage of a multi-stage indirect cooler so as to dry the first part of the metal salt in the hydrate drier and so as to control a waste gas temperature of the process. A second part of the metal salt is guided as a partial stream past the hydrate drier. The metal salt is preheated in a first preheating stage and precalcined in a second preheating stage. The metal salt and a fluidizing gas having a temperature of 150° C. or less are supplied to a fluidized bed reactor so as to calcine the metal salt to form a metal oxide product. The metal oxide product is cooled in at least one suspension heat exchanger and then in the multi-stage indirect cooler.

12 Claims, 1 Drawing Sheet

U.S. PATENT DOCUMENTS

| | | |
|---|---|---|
| 2006/0231466 A1 | 10/2006 | Nuber |
| 2009/0274589 A1 | 11/2009 | Hirsch et al. |

FOREIGN PATENT DOCUMENTS

| | | | |
|---|---|---|---|
| DE | 19805897 C1 | 12/1998 | |
| DE | 10260741 A1 | 7/2004 | |
| DE | 10260739 B3 | 9/2004 | |
| DE | 102007014435 A1 | 9/2008 | |
| DE | 102007041586 A1 | * | 3/2009 |
| EP | 0245751 A1 | 11/1987 | |
| EP | 0861208 B1 | 9/1998 | |
| WO | WO 2008113553 A1 | 9/2008 | |

* cited by examiner

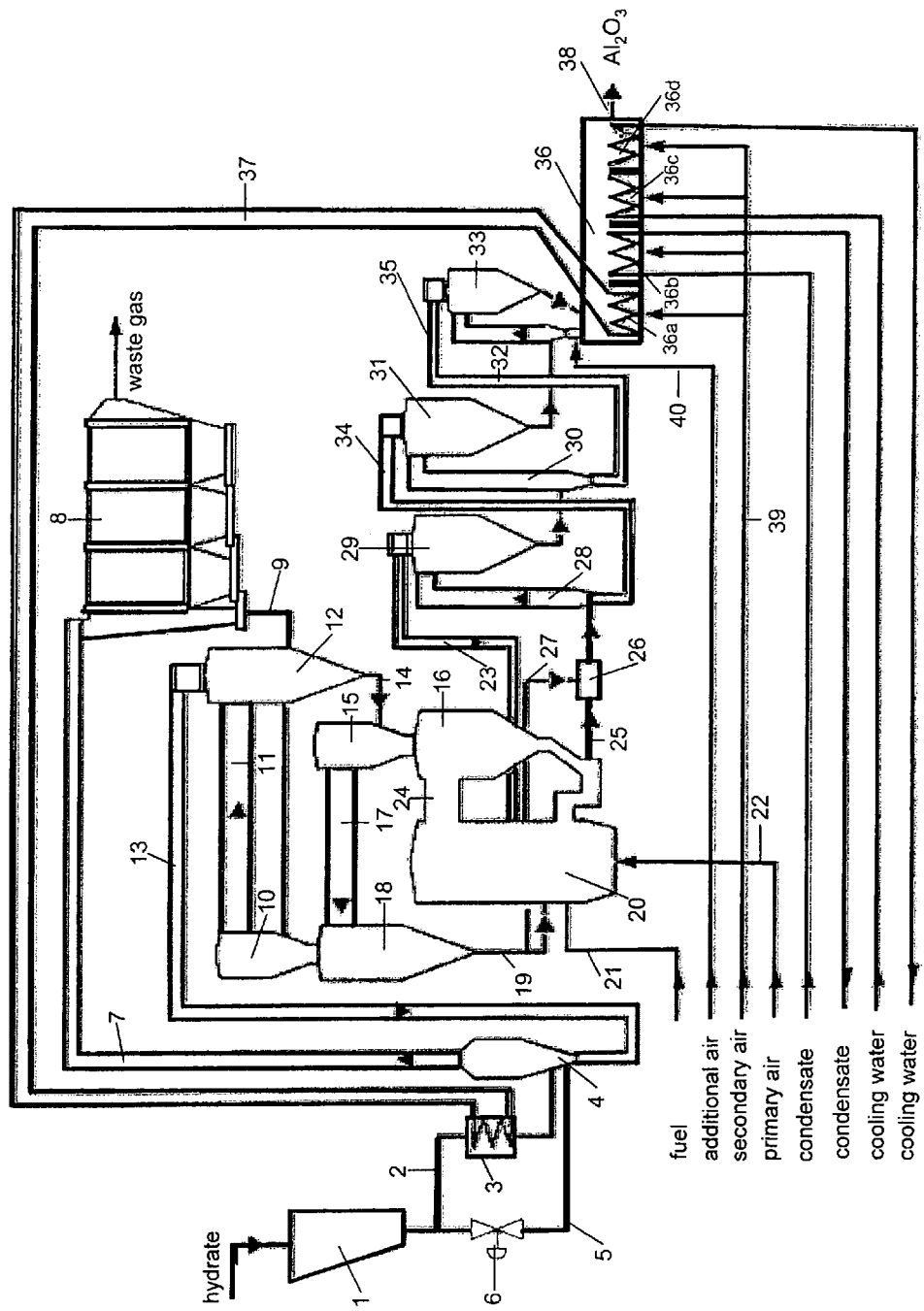

PROCESS AND PLANT FOR PRODUCING METAL OXIDE FROM METAL SALTS

CROSS REFERENCE TO PRIOR APPLICATIONS

This application is a U.S. National Phase Application under 35 U.S.C. §371 of International Application No. PCT/EP2009/009115, filed on Dec. 18, 2009, which claims priority to German Patent Application No. DE 10 2009 006 095, filed on Jan. 26, 2009. The International Application was published in English on Jul. 29, 2010 as WO 2010083865 under PCT Article 21 (2).

FIELD

The present invention relates to the production of metal oxide from metal hydroxide or other metal salts.

BACKGROUND

Metal hydroxides are a raw material for the production of metal oxides, which represent an important basic substance of inorganic chemistry. In their occurrences in nature, metal hydroxides chiefly are present in a mixed form, so that the raw materials must be cleaned up.

In the case of the production of aluminum hydroxide, this is accomplished by the so-called Bayer process, in which the mined minerals, mostly bauxite, are comminuted and impregnated with sodium hydroxide solution. Insoluble residues, such as red mud which chiefly contains iron oxide, thus can be separated from the dissolved aluminum hydrate by filtration, thickening or other means. By crystallization and further filtration, pure aluminum hydroxide ($Al(OH)_3$) is obtained from this solution.

A process for producing alumina ($Al_2O_3$) from aluminum hydroxide is described for example in EP 0 861 208 B1 or DE 10 2007 014 435 A1. The filter-moist aluminum hydroxide initially is dried in a first suspension heat exchanger and preheated to a temperature of about 160° C. Upon separation in a cyclone separator, the solids are supplied to a second suspension preheater, in which they are further dried with the waste gas from the recirculation cyclone of a circulating fluidized bed, and are then charged to a fluidized-bed reactor of the circulating fluidized bed. In the fluidized-bed reactor, the aluminum hydroxide is calcined to alumina at temperatures of about 1000° C. A partial stream of the preheated aluminum hydroxide is branched off after the first suspension preheater (EP 0 861 208 B1) or after the second suspension preheater (DE 10 2007 014 435 A1) and mixed with hot alumina withdrawn from the recirculation cylcone of the circulating fluidized bed. The hot product mixture subsequently is cooled in a multi-stage suspension cooler in direct contact with air and then supplied to a fluidized-bed cooler for final cooling. The fluidization of the fluidized bed in the fluidized-bed reactor is effected by means of fluidizing gas (primary air), which in a first chamber of the fluidized-bed cooler has been preheated to a temperature of 188° C. In the suspension heat exchangers for cooling the product, secondary air additionally is heated to 525° C. in a direct heat exchange with alumina, before it is supplied to the fluidized-bed reactor.

EP 0 245 751 B1 describes a process for performing endothermal processes on fine-grained solids, with which the product heat within the entire process should be utilized in a more efficient way. During the calcination of aluminum hydroxide, a partial stream of the starting material is supplied to an indirectly heated preheater and subsequently introduced into an electrostatic precipitator together with the directly supplied feedstock. The solids then are supplied from the electrostatic precipitator via two series-connected preheating systems to a circulating fluidized bed, in which the solids are fluidized with fluidizing gas (primary air) and calcined at temperatures of about 1000° C. The stream of solids withdrawn from the circulating fluidized bed is cooled in an indirect fluidized-bed cooler forming a first cooling stage and then supplied to second and third cooling stages, again in the form of fluidized-bed coolers, in order to further cool the solid product. The primary air heated in the first fluidized-bed cooler is introduced into the fluidized-bed reactor as fluidizing air with a temperature of 520° C., whereas the fluidizing air of the fluidized-bed coolers is fed into the fluidized-bed reactor as secondary air with a temperature of 670° C. The heat transfer medium of the second fluidized-bed cooler is supplied to the indirect preheater as the heating medium for the feedstock with a temperature of 200° C. and then recirculated to the inlet of the second fluidized-bed cooler upon cooling to 160° C.

The calcination of aluminum hydroxide requires very much energy. Conventional processes require an expenditure of energy of about 3000 kJ/kg of alumina produced.

SUMMARY

In an embodiment, the present invention provides a process for producing metal oxide from a metal salt. A first part of the metal salt is supplied to a hydrate drier so as to indirectly heat the first part of the metal salt in the hydrate dryer using a heat transfer medium from a first stage of a multi-stage indirect cooler so as to dry the first part of the metal salt in the hydrate drier and so as to control a waste gas temperature of the process. A second part of the metal salt is guided as a partial stream past the hydrate drier. The metal salt is preheated in a first preheating stage and precalcined in a second preheating stage. The metal salt and a fluidizing gas having a temperature of 150° C. or less are supplied to a fluidized bed reactor so as to calcine the metal salt to form a metal oxide product. The metal oxide product is cooled in at least one suspension heat exchanger and then cooled in the multi-stage indirect cooler.

BRIEF DESCRIPTION OF THE DRAWING

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

The single FIGURE schematically shows a plant for performing the process according to an embodiment of the invention.

DETAILED DESCRIPTION

In an embodiment, the present invention provides a process and a plant for production of a metal oxide from a metal salt, for example, from aluminum hydroxide, wherein the metal salt is preheated in a first preheating stage, precalcined in a second preheating stage and calcined to metal oxide in a reactor, and wherein the product obtained is then cooled in at least one suspension heat exchanger and subsequently in a multi-stage indirect cooler.

An aspect of the invention is to reduce the energy demand of a calcining plant and provide an efficient process for calcining metal hydroxide.

In an embodiment, a fluidizing gas is supplied to the reactor with a temperature of 40 to 150° C., in particular 70 to 120° C., and that before entering the first preheating stage the metal salt is at least partly supplied to a hydrate drier, in which it is indirectly heated to a temperature of preferably 80 to 120° C. with heat transfer medium from the first stage of the indirect cooler and dried. Since before entry into the fluidized-bed reactor the fluidizing gas (primary gas) no longer is heated to a high temperature, it no longer must be passed through the indirect cooler for heating purposes in contrast to the prior art. Since the first stage of the indirect cooler is no longer required for preheating the primary gas, it can be utilized for heating a heat transfer medium, which then is supplied to the hydrate drier for drying the feedstock. For indirectly heating the heat transfer medium, a fluidized-bed cooler preferably is used. Other types of cooler can also be used for this purpose, e.g. rotary coolers.

Since the primary gas is not preheated, the fluidizing air is directly introduced into the fluidized-bed reactor without further heating, in accordance with the invention.

The heat transfer medium from the first stage of the fluidized-bed cooler is preferably supplied to the hydrate drier with a temperature of 130 to 200° C., in particular 140 to 170° C.

In accordance with an embodiment of the invention, the heat transfer medium is circulated between the first stage of the fluidized-bed cooler and the hydrate drier, so that no additional heat transfer medium must be supplied. In the cooling stage, sufficient energy is available, in order to heat the heat transfer medium and achieve an efficient drying. At the same time, the energy transfer between cooling stage and drying is controlled in dependence on the amount and moisture of the aluminum hydroxide, so that a higher flexibility is achieved in the plant control and the energy consumption is reduced.

In accordance with the invention, a liquid heat transfer medium, e.g. thermal oil, but in particular water, is used, since this is available at low cost and can easily be shifted between the plant sections.

In the hydrate drier, the metal salt preferably is maintained in the fluidized condition, in order to increase the transfer of heat and thereby keep the heat exchange surface as small as possible. As fluidizing gas, air can be used advantageously. The gas from the hydrate drier, possibly upon dust separation, can be directly discharged into the ambient air or be used for recovering water.

In accordance with a preferred embodiment of the invention, the heat transfer medium, preferably pressurized water, is circulated with an elevated pressure of 1 to 50 bar, preferably about 2 to 40 bar. If thermal oil is used as heat transfer medium, the same can be brought to the required temperature almost without pressure.

In accordance with a preferred embodiment of the invention, a partial stream of the hydrate is guided past the hydrate drier. Thus, it is possible to react to different moisture contents of the hydrate. At the same time, the temperature of the waste gas can be controlled. In accordance with the invention, the waste gas temperature can be decreased to 110 to 170° C., preferably 120 to 140° C., so that the energy loss caused by the waste gas discharged via the chimney is reduced.

In accordance with an embodiment of the invention, a third preheating stage is provided after the second preheating stage, in which the metal salt is heated to a temperature of 250 to 500° C. Due to this stronger preheating of the metal salts, less energy should be supplied in the reactor, so that the lower temperature of the primary gas presents negligible effect. In addition, the third preheating stage provides for a more precise control of the temperature in the individual process steps and for an optimization of the process. As a result, the energy consumption can be further reduced.

In an embodiment, the present invention provides a plant for producing metal oxide from metal salts, which is suitable for performing the process described above. The plant includes at least one preheater in a first preheating stage for preheating the metal salt, at least one preheater in a second preheating stage for precalcining the metal salt, a reactor for calcining the metal salt to metal oxide, and at least one suspension cooler for directly cooling the product obtained as well as a multi-stage fluidized-bed cooler provided thereafter for indirectly cooling the product obtained. Before the first preheating stage a hydrate drier is provided in accordance with the invention for drying the metal salt, wherein a circulation conduit for a heat transfer medium for indirectly heating the hydrate is passed through the hydrate drier, and wherein the circulation conduit is connected with the first stage of the fluidized-bed cooler.

In accordance with an embodiment of the invention, a third preheating stage is provided after the second preheating stage, which includes a suspension heat exchanger and a separator.

In accordance with an embodiment of the invention, a bypass conduit is provided around the hydrate drier, which is connected with the first preheating stage, in order to be able to supply a partial stream of the hydrate directly to the first preheating stage.

In accordance with an embodiment of the invention, the division of the hydrate stream between the hydrate drier and the bypass conduit is effected via a control valve, which preferably is actuated in dependence on the waste gas temperature.

According to the flow diagram of the process of the invention, which is illustrated in the drawing, filter-moist aluminum hydroxide ($Al(OH)_3$) is charged at a charging station 1. Via a conduit 2, the aluminum hydroxide is introduced into a hydrate drier 3 in which the hydrate is heated to a temperature of about 100 to 110° C. by indirect heat exchange with a liquid heat transfer medium, in particular water, and is dried almost completely proceeding from a moisture of e.g. 6%. The dried hydrate subsequently is supplied to a suspension heat exchanger 4 of a first preheating stage and preheated to a temperature of 100 to 200° C. The temperature control in the hydrate drier is effected in dependence on the moisture of the hydrate supplied, so that it is possible to quickly react to fluctuations in the feedstock without reducing the energy efficiency of the plant.

A partial stream of the hydrate can be supplied via a bypass conduit 5 past the hydrate drier 3 directly to the suspension heat exchanger 4. The size of the partial stream is adjusted via a control valve 6, which can be arranged in the conduit 2 or the bypass conduit 5. The control of the bypass stream is effected in dependence on the waste gas temperature, in order to keep the energy loss as low as possible. If a greater amount of the hydrate is passed through the hydrate drier 3, the waste gas temperature of the suspension heat exchanger 4 rises, since more moisture (water) is removed in the hydrate drier 3 and is not evaporated in the succeeding suspension heat exchanger 4. When supplying a small amount of hydrate to the hydrate drier 3, a greater amount of moist hydrate is supplied to the suspension heat exchanger 4 and the waste gas temperature decreases correspondingly.

The solids introduced into the suspension heat exchanger 4 are entrained by a waste gas stream coming from a second preheating stage, are heated by the same and pneumatically introduced via a conduit 7 into the inlet region of an electrostatic gas cleaning (ESP) 8 constituting a preseparator. In the electrostatic precipitator 8, the gas is cleaned and discharged into a non-illustrated chimney with a temperature of 110 to 170° C., preferably 120 to 140° C. Because of the reduced content of water from the moist hydrate in the waste gas as a result of the upstream hydrate drier 3, there is no risk of condensation of water on the parts of the plant despite this low temperature. Due to the lack of condensation, corrosion in the plant is avoided.

Via a conduit 9, the solids emerging from the electrostatic gas cleaning 8 are delivered into a second suspension heat exchanger 10 of the second preheating stage, in which the solids are entrained by the gas stream emerging from the third preheating stage, heated to a temperature of 150 to 300° C. and supplied to a separating cyclone 12 via a conduit 11. Via a conduit 13, the waste gas stream of the separating cyclone 12 is supplied to the suspension heat exchanger 4, so that the hydrate is heated and delivered to the electrostatic precipitator 8.

Via a conduit 14, the solids from the separating cyclone 12 are fed into a third suspension heat exchanger 15 (third preheating stage), entrained by a gas stream emerging from a recirculation cyclone 16 of a circulating fluidized bed, and dewatered further at temperatures of 200 to 450° C., in particular 250 to 370° C., and at least partly dehydrated (precalcined) to aluminum monohydrate (AlOOH).

Via a conduit 17, the gas-solids stream is supplied to a separating cyclone 18, in which in turn a separation of the gas-solids stream is effected, wherein the solids are discharged downwards through a conduit 19 and the waste gas is introduced into the second suspension heat exchanger 10 of the second preheating stage.

In the second and in particular the third preheating stage, a precalcination of the metal salts thus is effected. Precalcination in the sense of the present invention is understood to be the partial dehydration or elimination of compounds, such as HCl and NOx. On the other hand, calcination refers to the complete dehydration or elimination of compounds such as $SO_2$. Metal salts in the sense of the invention preferably are metal hydroxides or metal carbonates, for example aluminum hydroxide.

After the separating cyclone 18 adjoining the third suspension heat exchanger 14, the solids stream is divided by means of an apparatus described for instance in DE 10 2007 014 435 A1. Via a conduit 19, a main stream containing about 80 to 90% of the solids stream is supplied to a fluidized-bed reactor 20, in which the aluminum monohydrate is calcined at temperatures of 850 to 1100° C., in particular about 950° C. and dehydrated to alumina ($Al_2O_3$). The supply of the fuel required for calcination is effected via a fuel conduit 21, which is arranged at a small height above the grate of the fluidized-bed reactor 20. The oxygen-containing gas streams required for combustion are supplied as fluidizing gas (primary air) via a supply conduit 22 and as secondary air via a supply conduit 23. Due to the supply of gas, a relatively high suspension density is obtained in the lower reactor region between the grate and the secondary gas supply 23, and a comparatively lower suspension density above the secondary gas supply 23. After the usual compression the primary air is fed into the fluidized-bed reactor 20 with a temperature of about 80° C. without further heating. The temperature of the secondary air is about 550° C.

Via a connecting conduit 24, the gas-solids suspension enters the recirculation cyclone 16 of the circulating fluidized bed, in which a further separation of solids and gas is effected. The solids emerging from the recirculation cyclone 16 via the conduit 25, which have a temperature of about 950° C., are fed into a mixing tank 26. Via a bypass conduit 27, the partial stream of the aluminum monohydrate separated below the separating cyclone 18, which has a temperature of about 320 to 370° C., is also introduced into the mixing tank 26. In the mixing tank 26, a mixing temperature of about 700° C. is adjusted corresponding to the mixing ratio between the hot alumina stream supplied via the conduit 25 and the aluminum monohydrate stream supplied via the bypass conduit 27. The two product streams are thoroughly mixed in the mixing tank 26, which includes a fluidized bed, so that the aluminum monohydrate supplied via the bypass conduit 27 is also completely calcined to alumina. A very long residence time of up to 30 minutes or up to 60 minutes leads to an excellent calcination in the mixing tank. However, a residence time of less than 2 minutes, in particular about 1 minute or even less than 30 seconds can also be sufficient.

From the mixing tank 26, the product obtained is introduced into a first suspension cooler formed of rising conduit 28 and cyclone separator 29. Via the conduit 23, the waste gas of the cyclone separator 29 is fed into the fluidized-bed reactor 20 as secondary air, the solids into the second suspension cooler formed of rising conduit 30 and cyclone separator 31, and finally into the third suspension cooler formed of rising conduit 32 and cyclone separator 33. The gas flow through the individual suspension coolers is effected in counterflow to the solids via the conduits 35 and 34.

After leaving the last suspension cooler, the alumina produced undergoes a final cooling in the fluidized-bed cooler 36 equipped with three to four cooling chambers. The alumina enters its first chamber 36a with a temperature of about 300° C. and heats a liquid heat transfer medium, in particular water, to a temperature of 140 to 195° C., preferably 150 to 190° C., and in particular 160 to 180° C. The heated heat transfer medium is supplied to the hydrate drier 3 via a circulation conduit 37, in order to dry the metal salt (hydrate) by indirect heat exchange. The hydrate is maintained in the fluidized condition, in order to increase the heat transfer and thereby dimension the heat exchange surface as small as possible. The hydrate then is slowly dried at a low temperature level and with relatively small temperature gradients or heating rates. Due to this careful treatment, the load of the hydrate particles is reduced and the probability for fracture is decreased. As a result, the amount of fine dust in the solids is reduced, which leads to smaller pressure losses in the plant. The steam obtained when drying the hydrate can be used to reduce the hydrate moisture on the hydrate filter. Since the amount of heat released by the fluidized-bed cooler 36 to the heat transfer medium only depends on the amount of alumina produced, the mass flow of the hydrate into the hydrate drier 3 can be increased by a lower hydrate moisture. As a result, the specific energy demand of the plant can further be reduced.

After passing through the hydrate drier 3, the heat transfer medium is recirculated to the first stage 36a of the fluidized-bed cooler via the circulation conduit 37 with a temperature of about 100 to 190° C., preferably 120 to 180° C. and in particular 140 to 170° C. The pressure in the heat transport circuit preferably is adjusted such that a condensation of the heat transfer medium in the hydrate drier 3 is avoided and is about 1 to 50 bar and in particular between 2 and 40 bar.

In the downstream chambers 36b to 36d, the alumina is cooled further to a temperature of about 80° C. by a heat transfer medium, preferably water, guided in counterflow and is then discharged as product via a conduit 38.

The chambers 36a to 36d are fluidized by means of secondary air, which is supplied with a temperature of 80 to 100° C. via a conduit 39. The secondary air subsequently is withdrawn from the fluidized-bed cooler 36 and used as conveying air for the third suspension cooler. Via a conduit 40, additional air can be supplied. Instead of air, pure oxygen or air enriched with oxygen with an oxygen content of 21 to 100 vol-% can also be supplied via the conduits 39 and/or 40.

By means of an embodiment of the invention, the temperature in the individual stages of the process can accurately be adjusted, whereby the process can be optimized and the energy consumption can be reduced. It hence is possible to quickly react to fluctuations in the quality, in particular the moisture of the feedstock. The waste gas temperatures in the chimney and hence the energy losses can be reduced distinctly as compared to the prior art. With a constant product quality, simulation calculations suggest a reduction of the required energy per kg of product of up to 10%. In addition, a careful treatment of the solids is obtained, so that the fracture of particles can be reduced.

While the invention has been described with reference to particular embodiments thereof, it will be understood by those having ordinary skill the art that various changes may be made therein without departing from the scope and spirit of the invention. Further, the present invention is not limited to the embodiments described herein; reference should be had to the appended claims.

The invention claimed is:

1. A process for producing metal oxide from a metal salt comprising:
    supplying a first part of the metal salt to a hydrate drier to indirectly heat the first part of the metal salt in the hydrate drier using a heat transfer medium from a first stage of a multi-stage indirect cooler to dry the first part of the metal salt and to control a waste gas temperature of the process by decreasing the waste gas temperature to 110° C. to 170° C.;
    guiding a second part of the metal salt as a partial stream past the hydrate drier;
    preheating the first and second parts of the metal salt in a first preheating stage;
    precalcining the preheated metal salt in a second preheating stage;
    supplying the precalcined metal salt and a fluidizing gas having a temperature of 150° C. or less to a fluidized bed reactor to calcine the metal salt to form a metal oxide product;
    cooling the metal oxide product in at least one suspension heat exchanger; and then
    cooling the metal oxide product in the multi-stage indirect cooler.

2. The process as recited in claim 1, wherein the metal salt is aluminium hydroxide.

3. The process as recited in claim 1, further comprising compressing the fluidizing gas prior to the supplying of the fluidizing gas to the fluidized bed reactor.

4. The process as recited in claim 1, wherein the first part of the metal salt is heated in the hydrate drier to a temperature of 80° C. to 120° C.

5. The process as recited in claim 1, wherein the heat transfer medium is supplied to the hydrate dryer at a temperature of 130° C. to 200° C.

6. The process as recited in claim 1, further comprising circulating the heat transfer medium between the first stage of the indirect cooler and the hydrate drier.

7. The process as recited in claim 6, wherein the heat transfer medium is circulated at a pressure of 1 to 50 bar.

8. The process as recited in claim 7, wherein the heat transfer medium is circulated at a pressure of 2 to 10 bar.

9. The process as recited in claim 1, wherein the heat transfer medium is a liquid heat transfer medium.

10. The process as recited in claim 9, wherein the liquid heat transfer medium includes water.

11. The process as recited in claim 1, wherein the first part of the metal salt is maintained in a fluidized condition in the hydrate drier.

12. The process as recited in claim 1, further comprising, after the precalcining in the second preheating stage, heating the precalcined metal salt to a temperature of 200° C. to 500° C. in a third preheating stage.

* * * * *